United States Patent
Gueziec

(10) Patent No.: US 6,285,805 B1
(45) Date of Patent: Sep. 4, 2001

(54) SYSTEM AND METHOD FOR FINDING THE DISTANCE FROM A MOVING QUERY POINT TO THE CLOSEST POINT ON ONE OR MORE CONVEX OR NON-CONVEX SHAPES

(75) Inventor: Andre Gueziec, Mamaroneck, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/236,688

(22) Filed: Jan. 25, 1999

(51) Int. Cl.[7] .................................................. G06K 9/32

(52) U.S. Cl. .................................... 382/299; 707/3

(58) Field of Search ................................. 382/298, 254, 382/154, 153, 299, 241, 305; 345/418, 419, 420, 429, 430, 442; 707/3, 4, 5

(56) References Cited

U.S. PATENT DOCUMENTS

| | | | | |
|---|---|---|---|---|
| 5,189,709 | * | 2/1993 | Wang et al. | 382/10 |
| 5,566,292 | * | 10/1996 | Krembs | 345/442 |
| 5,655,063 | * | 8/1997 | Crocker | 345/420 |
| 5,715,166 | | 2/1998 | Besl et al. | 700/182 |
| 5,892,515 | * | 4/1999 | Kobayashi et al. | 345/423 |
| 6,104,404 | * | 8/2000 | Masuda et al. | 345/420 |
| 6,108,006 | * | 8/2000 | Hoppe | 345/423 |
| 6,128,767 | * | 10/2000 | Chapman | 716/1 |
| 6,137,910 | * | 10/2000 | Shinagawa et al. | 382/195 |

OTHER PUBLICATIONS

A. Gueziec, Surface Simplification with Variable Tolerance, Proceedings of the Second International Symposium on Medical Robotics & Computer Assisted Surgery, MRCAS '95, Baltimore, MD 11/4–7/95.

(List continued on next page.)

Primary Examiner—Leo Boudreau
Assistant Examiner—Kanji Patel
(74) Attorney, Agent, or Firm—F. Chau & Associates, LLP

(57) ABSTRACT

The present invention is a computer system and method for determining the closest point on a shape (2 dimensional or 3 dimensional surface) to any general query point. The system has one or more central processing units (CPUs), one or more memories, and one or more geometric model portions stored in one or more of the memories. The geometric model portions have a plurality of line segments (polygons), each of the line segments (polygons) being between a first and a second endpoint (having a polygon boundary). The line segments and end points (polygons and polygon boundaries) are connected to form a shape (in 3 dimensions, a surface) with one or more parameters. Parameters can include geometric position, time, temperature, pressure, flow, color, texture, or any other descriptive value. A multiresolution process that creates one or more models of the shape (surface). The models having a hierarchy of resolutions. Each model has one or more model line segments (model polygons) that approximate one or more of the line segments (polygons). Each model line segment (model polygons) is associated with an error. A distance process, for every model line segment (polygon), determines a distance between a closest point on one or more of the model line segments and a query point. The distance represents one or a combination of two or more of the parameters. The process further determines a confidence level in terms of an upper bound and a lower bound of an envelope enclosing the segment (polygon). The closest point is within the envelope—the upper bound representing an upper limit of the parameter in the envelope determined by an upper error of the respective model containing the model line segment and the lower bound representing a lower limit of the parameter in the envelope determined by a lower error of the respective model. A priority process orders the model line segments (polygons) according to their respective lower bounds and if a maximum error for every one of the model line segments is less than a threshold. The priority process also selects the smallest distance as the minimum distance between the query point and the shape.

30 Claims, 17 Drawing Sheets

OTHER PUBLICATIONS

Hanan Samet, Applications of Spatial Data Structures, pp. 228–229.

Sato; Yuichi, et al., Method of searching for points of closest approach, and preprocessing method therefor, (US5675720), http://www.patents.ibm.com.

M. Lin, Efficient Collision Detection for Animation and Robotics, Dept. of Electrical Engineering & Computer Science, Univ. of California at Berkeley, pp. 21–40.

J. Klosowski, et al., Efficient Collision Detection Using Bounding Volume Hierarchies of k–Dops, IEEE Transactions on Visualization & Computer Graphics, vol. 4, No. 1, Jan.–Mar. 1998, pp. 21–36.

T. Cormen, Introduction to Algorithms, The MIT ress, pp. 89, 140–147, 485–487.

* cited by examiner

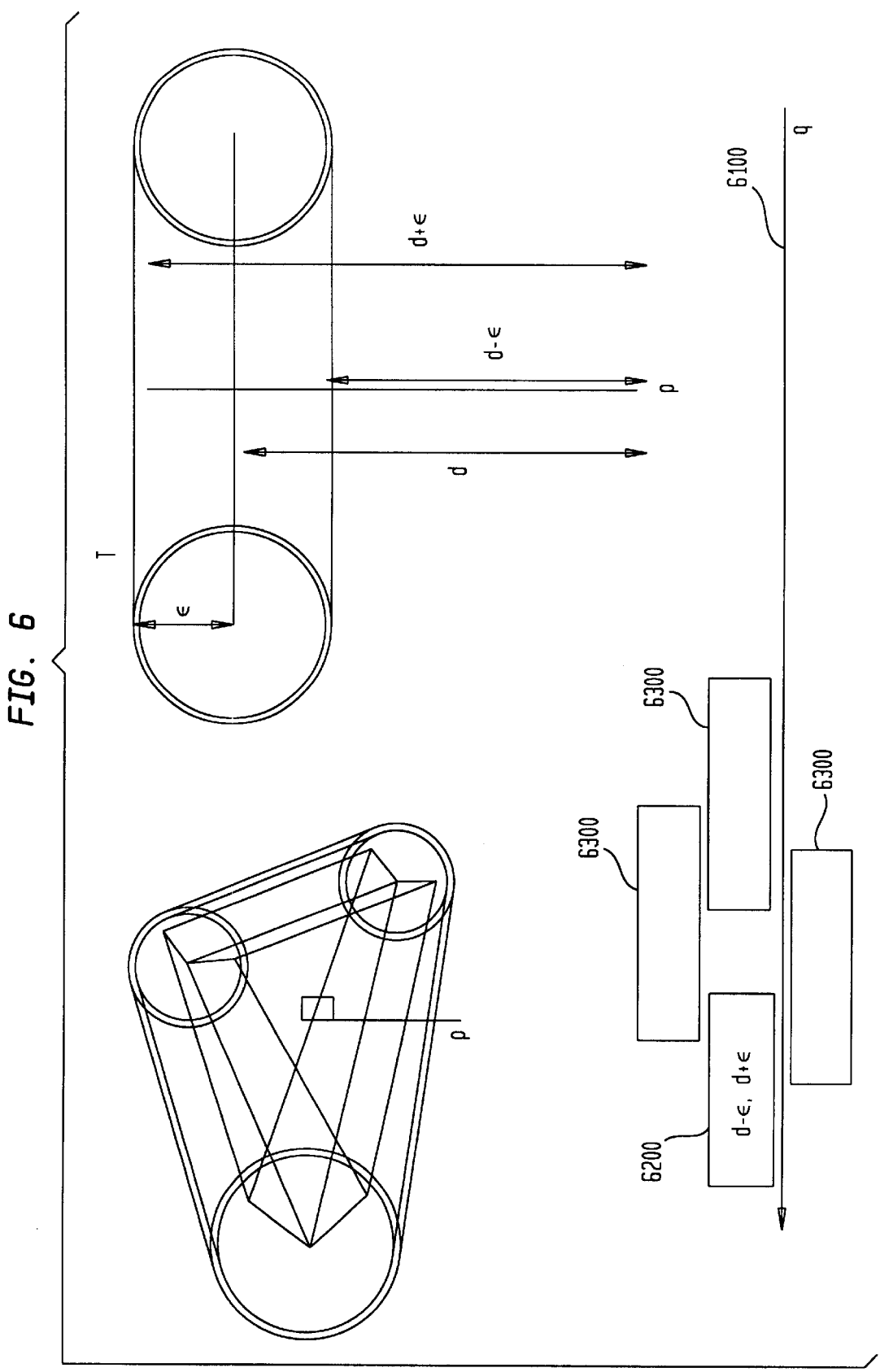

SYSTEM AND METHOD FOR FINDING THE DISTANCE FROM A MOVING QUERY POINT TO THE CLOSEST POINT ON ONE OR MORE CONVEX OR NON-CONVEX SHAPES

FIELD OF THE INVENTION

This invention relates to determining the distance between a query point and one or more non-convex shapes in either two or three dimensions. More specifically, the invention relates to determining the position of a query point maneuvering in proximity to non-convex shapes in the following areas: robotics, image processing, global positioning, computer graphics.

BACKGROUND OF THE INVENTION

Polygonal shapes (curves and surfaces) are common choices for representing 2D and 3D models in the manufacturing, architectural, Geographic Information Systems, geoscience, warfare simulation, medical imaging, robotics, and entertainment industries.

It is frequently necessary to determine accurately the shortest distance to and closest point on such a shape from a given point or shape: this is important for instance in robotics in order to predict whether collisions between shapes are about to occur.

A shape typically is represented by either a polygonal curve or a polygonal surface. A polygonal curve has vertices connected by edges. A polygonal surface typically is represented by a triangular mesh which has vertices connected by triangles and edges. For a more detailed description, see U.S. patent application Ser. No. 006,771 entitled COMPRESSED REPRESENTATION OF CHANGING MESHES AND METHOD TO DECOMPRESS, filed Jan. 14, 1998 by G. Taubin and A. Gueziec, U.S. patent application Ser. No. 023,757, entitled PROGRESSIVE MULTI-LEVEL TRANSMISSION AND DISPLAY OF TRIANGULAR MESHES by A. Gueziec, G. Taubin and F. Lazarus, and U.S. patent application Ser. No. 976,247 entitled PROGRESSIVE COMPRESSION OF CLUSTERED MULTI-RESOLUTION POLYGONAL MODELS all of which are herein incorporated by reference in their entirety.

A query point is a point for which it is sought to compute the distance and closest point on one or more polygonal surfaces.

The problem of finding the shortest distance and closest point is very related to the problem of detecting intersections between shapes, because intersections are locations where such distances are zero. The problem of detecting intersections were recently studied by Ming Lin in "Efficient Collision Detection for Animation and Robotics", PhD Thesis, University of California, Berkeley, 1993, and by J. Klosowski et al., in "Efficient Collision Detection Using Bounding Volume Hierarchies of k-DOPS" in IEEE Transactions on Visualization and Computer Graphics, Vol 4. No. 1, January–March 1998, pages 21–36, all of which are herein incorporated by reference in their entirety. Other related work is described in the Lin and Klosowski's publications.

Ming Lin proposes a solution to find the shortest distance between a point and a convex shape and between two convex shapes. To generalize his solution to non-convex shapes, it is necessary to decompose non-convex shapes into convex shapes, which not only is known as a delicate operation by anyone versed in the field (there may be a high number of convex-subparts), but increases significantly the computational complexity of the method, because the computations must be performed on each shape separately. Another related method for finding closest pairs of points on convex shapes is described in U.S. Pat. No. 5,675,720 METHOD FOR SEARCHING FOR POINTS OF CLOSEST APPROACH AND PREPROCESSING METHOD THEREFOR. As with Ming Lin's method, this method does not easily generalize to solving the problem of finding a closest point on a non-convex shape. Klosowski's work does not generally apply to the problem of finding the closest point, but relates to finding the closest point as applied to an intersection or a touching.

Spatial data structures called quad-trees and Octrees can be used to solve a version of the same problem called Nearest Object location problem. For details, see p 228–9 of Applications of Spatial Data Structures, by H. Samet, Addison Wesley 1989. This problem is different because the shortest distance and closest point are not required in finding the closest object.

In U.S. Pat. No. 5,715,166 APPARATUS FOR THE REGISTRATION OF THREE-DIMENSIONAL SHAPES (which is herein incorporated by reference in its entirety), P. Besl and N. Mc Kay compute the distance from a query point to a three dimensional polygonal shape composed of triangles by computing the distances between the query point and each individual triangle (that is inside a min-max box defined in the vicinity of the query point) and by taking the minimum of the distances. This computation is expensive because the distance to each triangle composing, the shape is computed.

PROBLEMS WITH THE PRIOR ART

Although the prior art methods are useful for computing distances between points and convex shapes, they fail to provide a satisfactory solution to the problem of determining accurately the shortest distance and closest point on a non-convex shape. Such methods require segmenting the shape in convex parts (including the Besl and Mc Kay method, wherein convex parts are triangles), solving separate instances of the problem on each convex part, and integrating the results obtained for each convex part: these operations are costly and can present significant challenges (such as segmenting a shape in a relatively small number of parts).

OBJECTS OF THE INVENTION

An object of this invention is an improved system and method for determining the distance from a query point to one or more convex or non convex-shapes.

Another object of this invention is all improved system and method for determining distances between convex or non-convex shapes.

SUMMARY OF THE INVENTION

The present invention is a computer system and method for determining the closest point on a shape (2 dimensional or 3 dimensional surface) to any general query point. The system has one or more central processing units (CPUs), one or more memories, and one or more geometric model portions stored in one or more of the memories. The geometric model portions have a plurality of line segments (and alternatively in 3 dimensions, polygons), each of the line segments (polygons) being between a first and a second endpoint (having a polygon boundary). The line segments and end points (polygons and polygon boundaries) are connected to form a shape (in 3 dimensions, a surface) with one or more parameters. Parameters can include geometric position, time, temperature, pressure, flow, color, texture, or any other descriptive value.

A multiresolution process creates one or more models of the shape (surface). The models have a hierarchy of resolutions. Each model has one or more model line segments (model polygons) that approximate one or more of the line segments (polygons). Each model line segment (model polygons) is associated with an error.

A distance process, for every model line segment (polygon), determines a distance between a closest point on one or more of the model line segments (polygon) and a query point. The distance represents one or a combination of two or more of the parameters. The process further determines a confidence level in terms of an upper bound and a lower bound of an envelope enclosing the segment (polygon). The closest point is within the envelope—the upper bound representing an upper limit of the parameter in the envelope determined by an upper error of the respective model containing the model line segment and the lower bound representing a lower limit of the parameter in the envelope determined by a lower error of the respective model.

A priority process orders the model line segments (polygons) according to their respective lower bounds and if a maximum error for every one of the model line segments is less than a threshold. The priority process also selects the smallest distance as the minimum distance between the query point and the shape.

BRIEF DESCRIPTION OF THE DRAWINGS

FIG. 6 is a diagram of an envelope used for a three dimensional shape and further shows ordering of the polygons in the priority queue.

Figure 1:
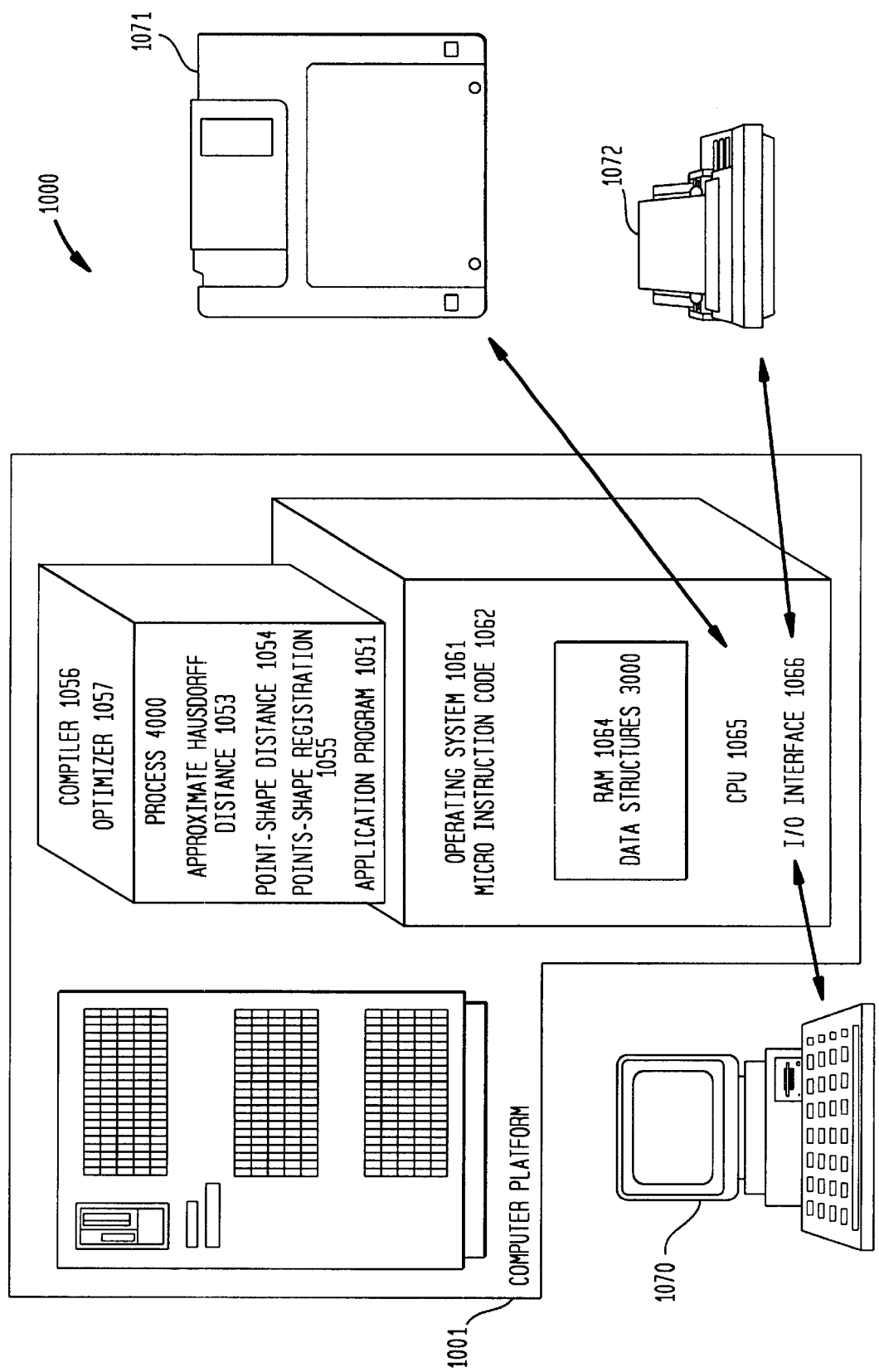
FIG. 1 is a block diagram of one preferred embodiment of the present system.

DETAILED DESCRIPTION OF THE INVENTION:

FIG. 1 is a block diagram of one preferred embodiment of the present computer system 1000. The preferred embodiment includes one or more application programs 1051. One type of application program is a compiler 1056 which includes an optimizer 1057. The compiler 1056 and optimizer 1057 are configured to transform a source program into optimized executable code. The compiler 1056 and optimizer 1057 operate on a computer platform 1001. Some application programs 1051 that run on the computer system 1000 include, according to the present invention, a computer program 1054 computing a point to shape distance, a computer program 1053 computing an approximate Hausdorff distance, and a process 4000 of solving a closest point query.

The computer platform 1001 includes one or more central processing units (CPU) 1065, a random access memory (RAM) 1064, and an input/output interface 1066. Microinstruction code 1062, for instance a reduced instruction set, may also be included on the platform 1001. Various peripheral components may be connected to the computer platform 1001, including a terminal and user interface 1070, a data storage device 1071, and a printing device 1072. An operating system 1061 coordinates the operation of the various components of the computer system 1000. An example of computer system 1000 is the IBM IntelliStation (IBM IntelliStation is a trademark of the International Business Machines Corporation.) It is readily understood that those skilled in the computer arts will be familiar with many equivalent computer systems 1000, and the teachings of this invention are not intended to be limited for use with any one particular type of computer or computer architecture.

Figure 2:
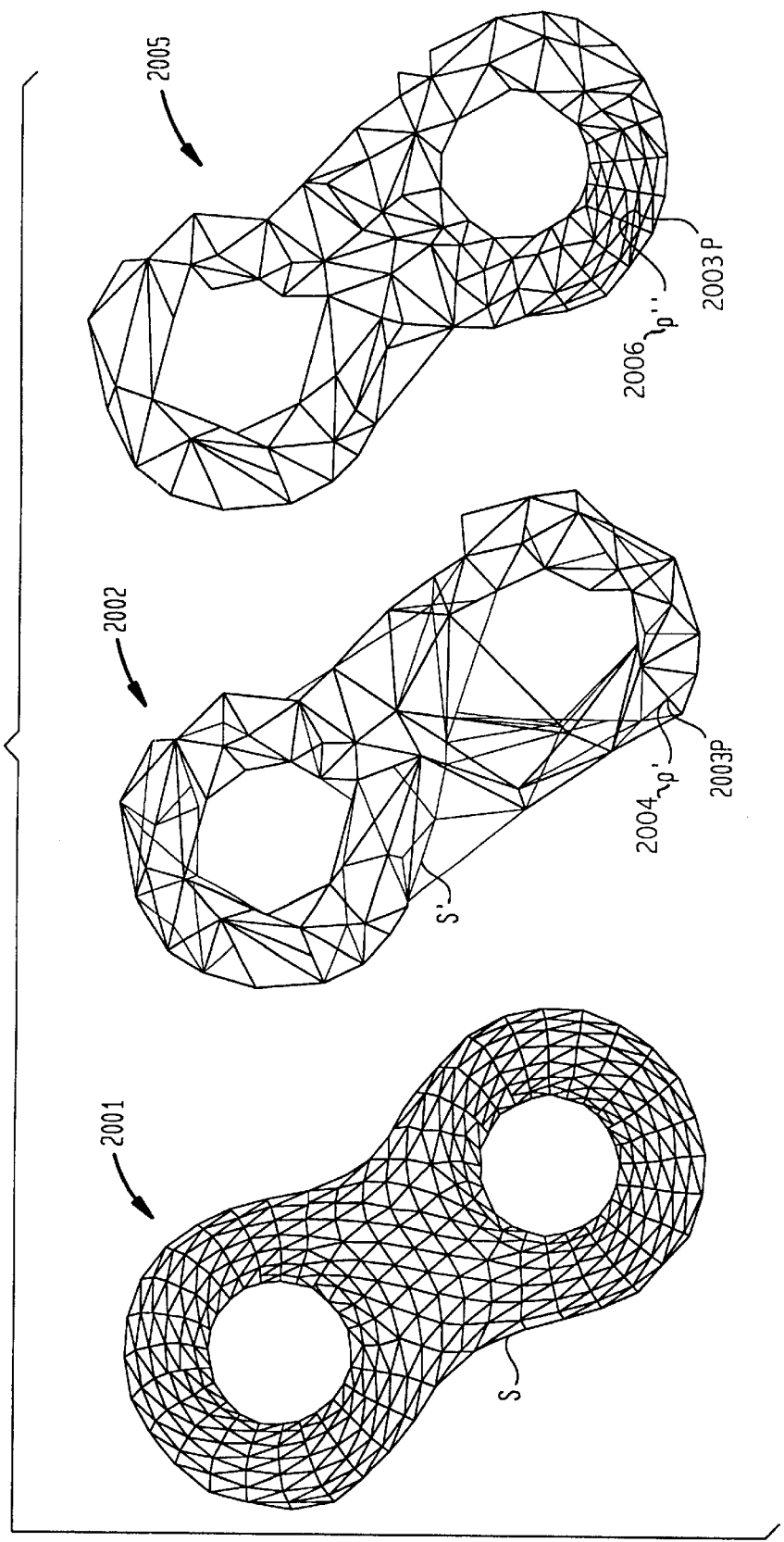
FIG. 2 is a diagram showing a shape with a model of a shape with a hierarchy of three resolutions, a query point, and a closest point on the model of the shape.

Further understanding of the operation of this invention may be achieved with reference to FIG. 2. Referring to FIG. 2, a three dimensional shape 2001 is shown with a hierarchy of three resolutions. A simplified, or low resolution representation 2002 as shown in FIG. 2 can be produced by a sequence of edge collapses 12000 as taught in the prior art (see for instance the article by A. Gueziec entitled "Surface Simplification with Variable Tolerance" in Proceedings of the Second Annual Symposium on Medical Robotics and Computer Assisted Surgery published by Wiley, New York, pages 132–139, which is herein incorporated by reference in its entirety). Considering a query point 2003, an approximate closest point 2004 is determined on the low resolution shape 2002, which contains fewer triangles than shape 2001. Upon examining the distances to the triangles of the low resolution shape 2002, a process 4000 selectively refines the low resolution shape 2002 by inserting triangles in the vicinity of the approximate closest point 2004, and obtains a refined shape 2005. A closest point 2006 from the query point 2003 is then determined on the refined shape 2005.

Figure 3:
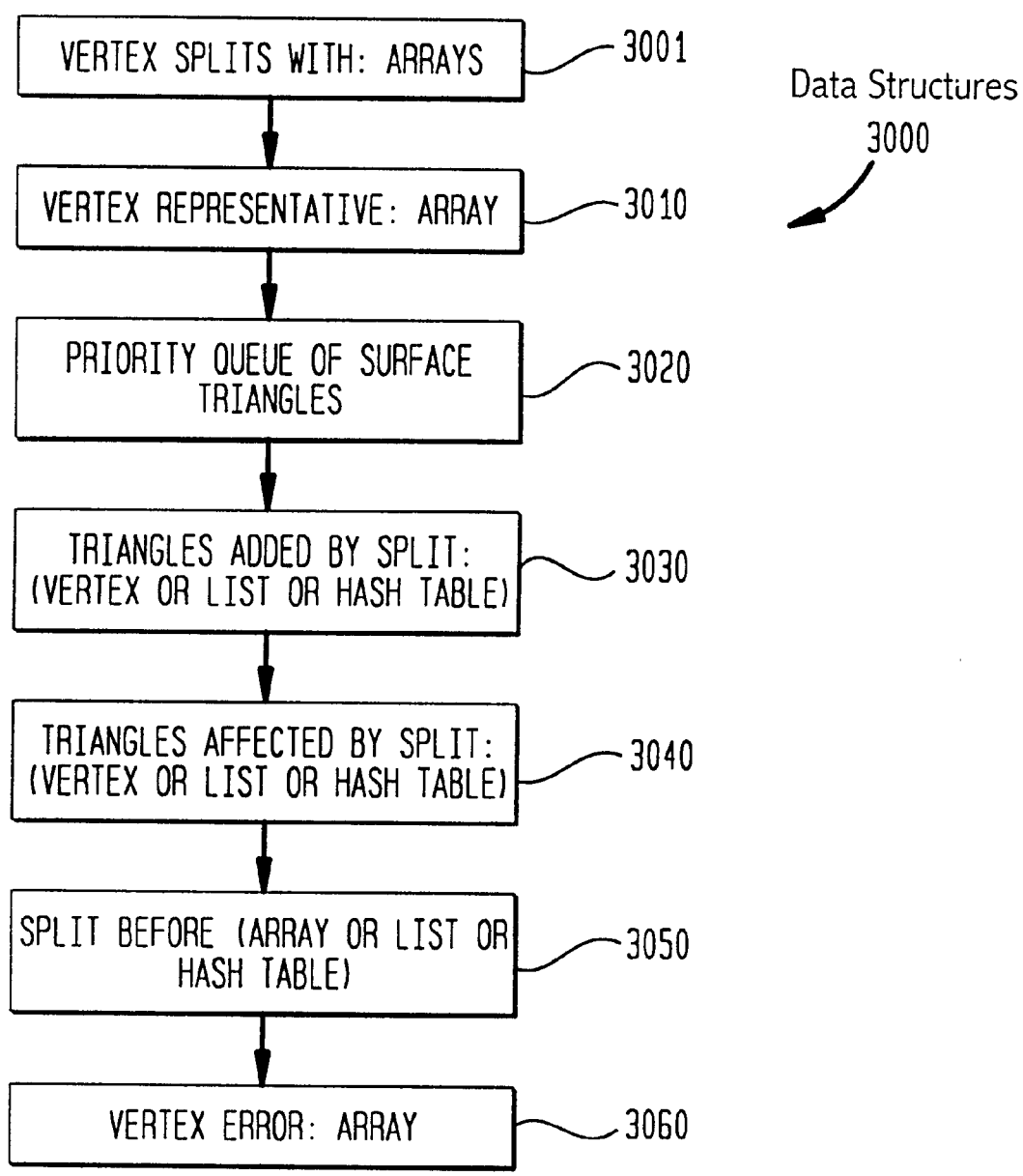
FIG. 3 is a block diagram of data structures used by the present invention.

The process 4000 of solving, a closest point query by selectively refining a shape can be further understood by studying the data structures used with reference to FIG. 3. Referring to FIG. 3, the present invention uses a "vertex splits with" array 3001 recording vertex splits 11100 (which are inverses of edge collapses 11000) that may be applied. A "vertex representative" array 3010 is used to indicate which vertex must be substituted for (or represent) another vertex when an edge collapse 11000 is applied. A priority queue 3020 is used for the priority process. A "triangles added by split" structure 3030 lists the triangles that should be inserted in a shape when a particular vertex split 11100 is applied. A "triangles affected by split" structure 3040 lists the triangles for which a distance must be recomputed when a particular vertex split is applied. A "split before" 3050 structure lists the vertices that shall preferably be split before a particular vertex. A "vertex error" array 3060 lists errors that are used to compute an upper and lower bound of an envelope enclosing, the shape triangles or segments.

Figure 4A:
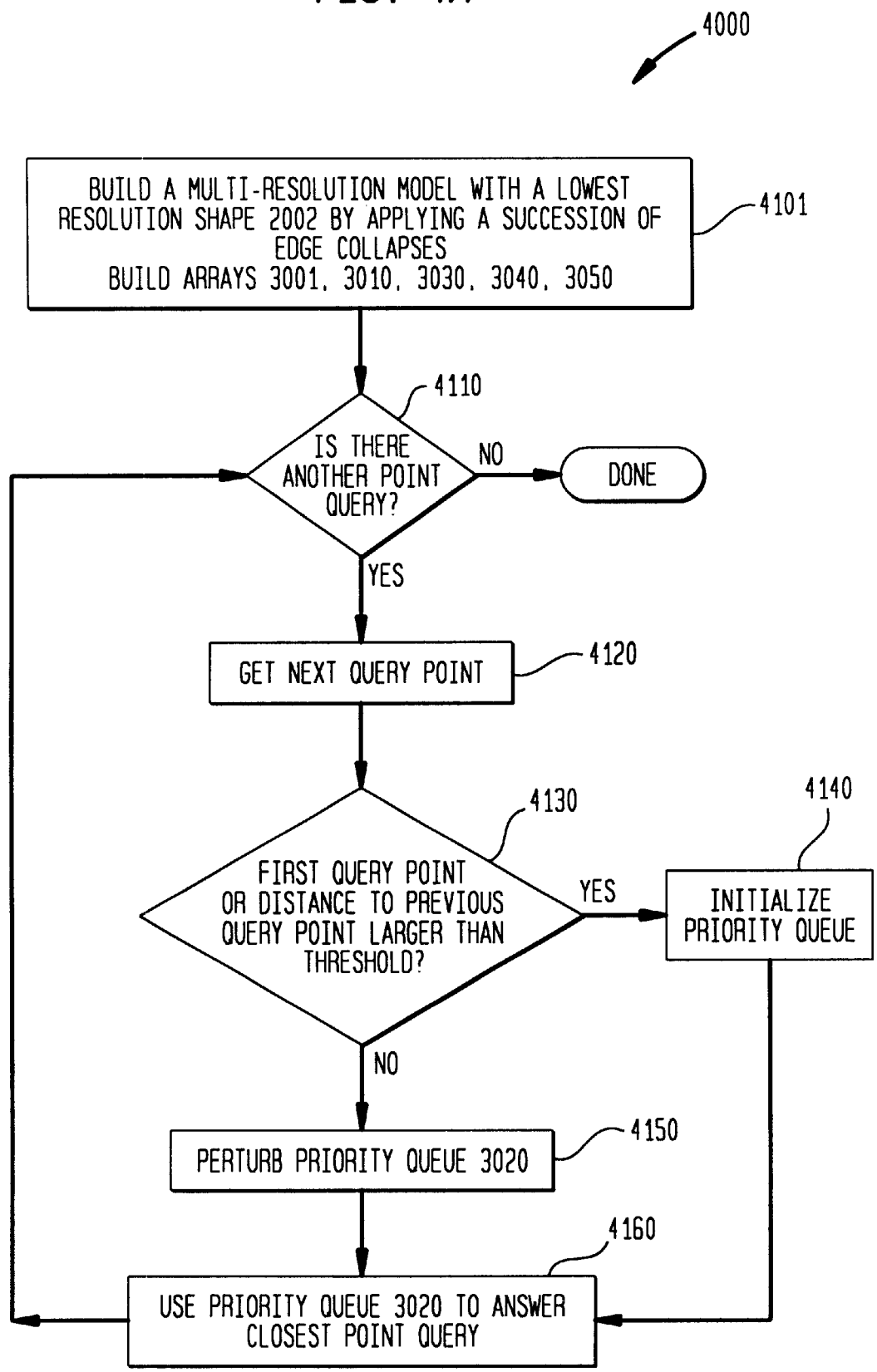
FIG. 4a is a flow chart of showing an overview of the process 4000 including the mutiresolution process step 4101.

Referring to FIG. 4a, the process 4000 of answering a closest point query starts with a multiresolution process 4101 computing a low resolution shape 2002 starting with a shape 2001, by applying a sequence of edge collapses 11000. In Step 4101, the structures 3001, 3010, 3020, 3030, 3040, 3050 and 3060 are built. An example of multiresolution process is described in U.S. patent application Ser. No. 742,641, entitled SURFACE SIMPLIFICATION PRESERVING A SOLID VOLUME AND RESPECTING DISTANCE TOLERANCES, filed Nov. 1st, 1996 by A. Gueziec, which is herein incorporated by reference in its entirety. This patent application describes a preferred method for computing "vertex errors" 3060. In Step 4110 the process determines whether there is another query point. If this is the case, Step 4120 is executed, otherwise the process ends. In step 4120, a next query point 2003 is retrieved from the input to the process. Step 4130 determines whether the query point 2003 is the first query point or whether the distance from the query point 2003 to the previous query point is larger than a threshold. If either condition is satisfied, the priority queue 3020 is initialized in Step 4140, otherwise the process executes Step 4150, perturbing the priority queue 3020. In Step 4160, the priority queue 3020 is used to answer the closest point query and the process returns to Step 4110.

Figure 4B:
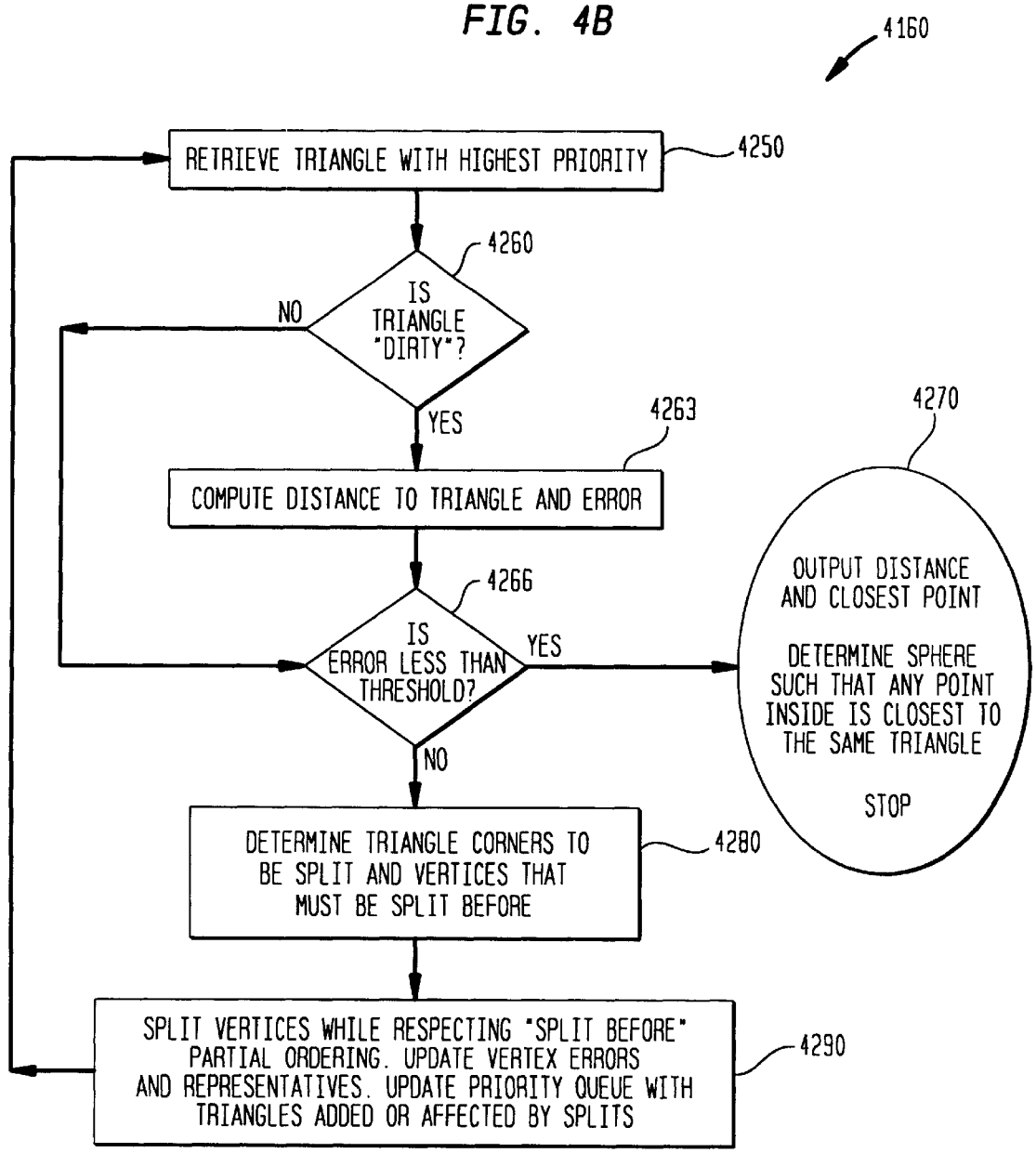
FIG. 4b is a flow chart showing a distance process and a priority process.

Referring to FIG. 4b, Step 4160 of using the priority queue 3020 to answer a closest point query is composed of the following steps. In Step 4250 the triangle 4200 (or segment of a two-dimensional shape) with the highest priority is retrieved from the priority queue 4250. Step 4260 determines whether the triangle 4200 is "dirty". Triangles are determined to be "dirty" in Step 10700, which can be further understood with reference to FIG. 10a. If the triangle 4200 is determined to be dirty, then in Step 4263 the system recomputes the distance and error associated to the triangle 4200 and then executes Step 4266, otherwise, the system directly executes Step 4266.

In Step 4266, the system determines whether the error associated with the triangle 4200 is less than a threshold. If both conditions are satisfied, the method executes Step 4270; otherwise Step 4280 is executed. In Step 4270, the distance (in x,y,z coordinate space) from the query point to the triangle 4200 and the closest point to the query point on the triangle 4200 are computed using any known method of the prior art, and are output as the solution of the closest point query. A preferred method for computing a distance from a point to a triangle is presented in U.S. Pat. No. 5,715,166 APPARATUS FOR THE REGISTRATION OF THREE-DIMENSIONAL SHAPES by P. Besl and N. Mc Kay. Also in Step 4270, a radius of a sphere is computed such that any query point inside that sphere has its closest point on the triangle 4200: the center of this sphere is preferably chosen as the position of the current query point 2003; the radius of the sphere is preferably computed by computing one half of the opposite of the difference between of the upper bound of the triangle with the highest priority to the lower bound of the triangle with the next highest priority; in case the radius is negative then a sphere as defined above cannot be determined. In Step 4280, the corners of the triangle 4200 that shall be preferably split are determined. The vertices that must be split before are also determined in Step 4280. In Step 4290, vertices are split, respecting, the ordering specified in the "split before" structure 3050. The "Vertex errors" 3060 and "vertex representatives" 3010 structures are updated to reflect the vertex splits. Triangles listed in the "triangles added" 3030 and "triangles affected" 3040 structures are used to update the priority queue 3020.

In an alternate embodiment of the present invention a distance from a point to a triangle is computed in parameter space, wherein a parameter is a RGB color, texture coordinate or data value or vector. The distance from a point to a triangle in parameter space, wherein a parameter is a RGB color, texture coordinate or data value or vector is preferably determined using the same computations as set forth above in x,y,z coordinate space by substituting x,y,z with R, G, and B or with a first texture coordinate, a second texture coordinate and zero, or with a data value, zero and zero, or with a first data vector coordinate, a second data vector coordinate and a third data vector coordinate.

Figure 4C:
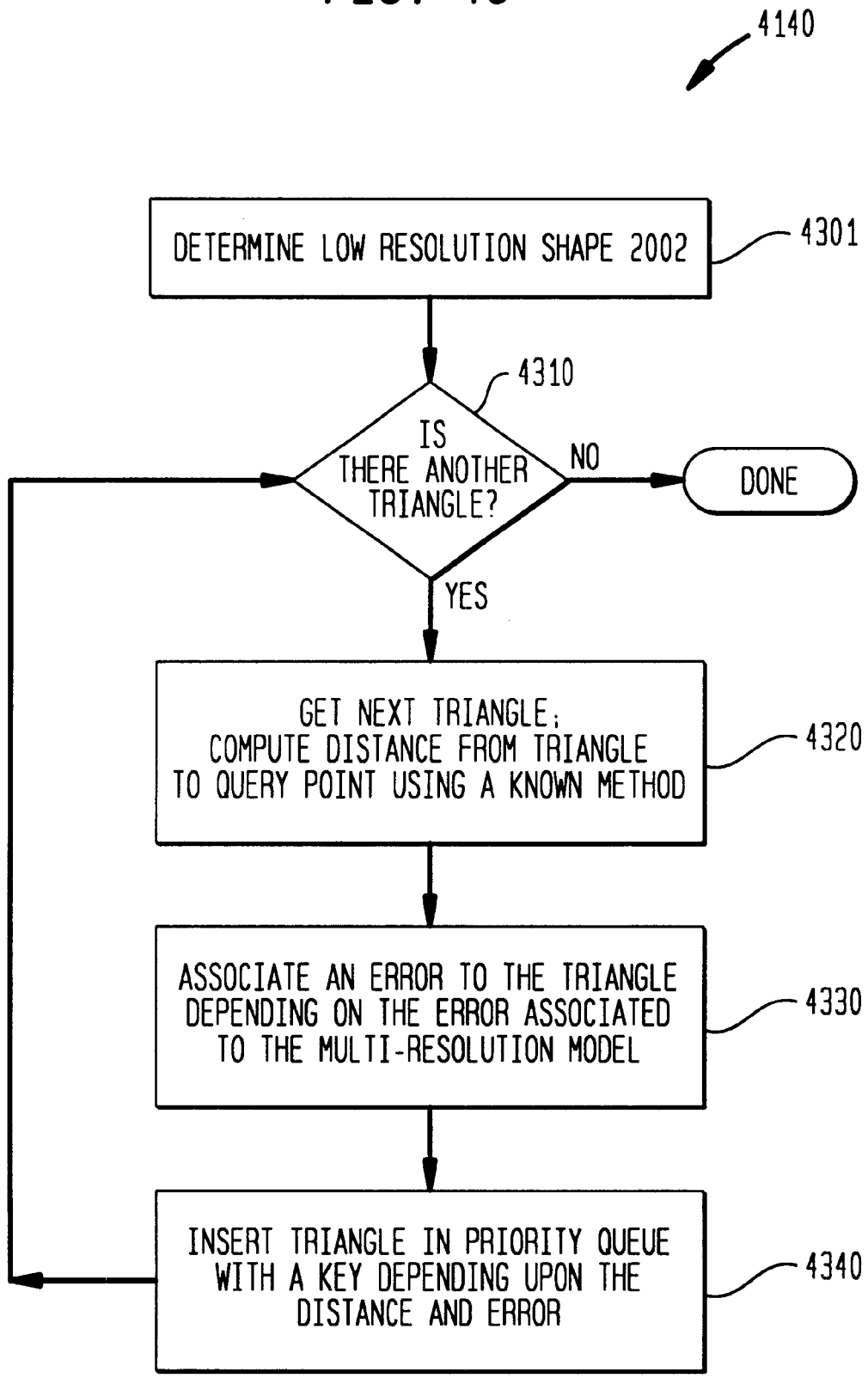
FIG. 4c is a flow chart showing an initialization process for initializing a priority queue shown in FIG. 8.

FIG. 4c further details the process 4140 or initializing the priority queue 3020. In Step 4301, the low resolution shape 2002 is built or retrieved from storage. Step 4310 determines whether there is another triangle in the low resolution shape 2002. If this is the case, the method executes Step 4320, otherwise the process 4140 ends (is complete). In Step 4320, a next triangle 4300 is retrieved from the low resolution shape 2002. The distance from the query point 2003 to the triangle 4300 is computed using any known method of the prior art. The method then executes Step 4330 of associating an error to the triangle 4300, preferably by computing the maximum of the three "vertex error" 3060 values associated to the three vertices of the triangle 4300. Another preferred method for associating an error to the triangle is illustrated in FIG. 5a and explained subsequently. The method then executes 4340 of inserting the triangle 4300 in the priority queue 3020 using a key depending upon the distance and error. A preferred method of computing the key is to subtract the error from the distance. The method then returns to Step 4310.

Figure 4D:
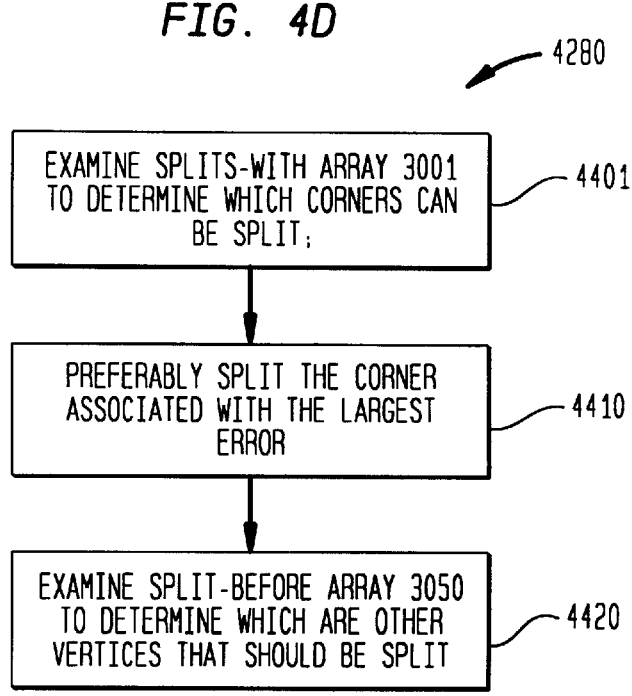
FIG. 4d is a flow chart showing detailed process steps of splitting vertices, used in the distance process.

FIG. 4d is a flow chart illustrating the process 4280 of determining the triangle corner to be split and the vertices that must be split before. In Step 4401, the three corners of the triangle 4200 are tested against the "splits with" data structure 3001 and those represented in the "splits with" data structure 3001 are retained for the subsequent Step 4410. In Step 4410, among the corners retained so far, the corner 4400 associated with the largest error (as specified in the "vertex error" 3060 structure) is retained and the method executes Step 4420. In Step 4420, vertices that must be split before corner 4400 are determined as listed in the "split before" structure 3050.

Figure 4E:
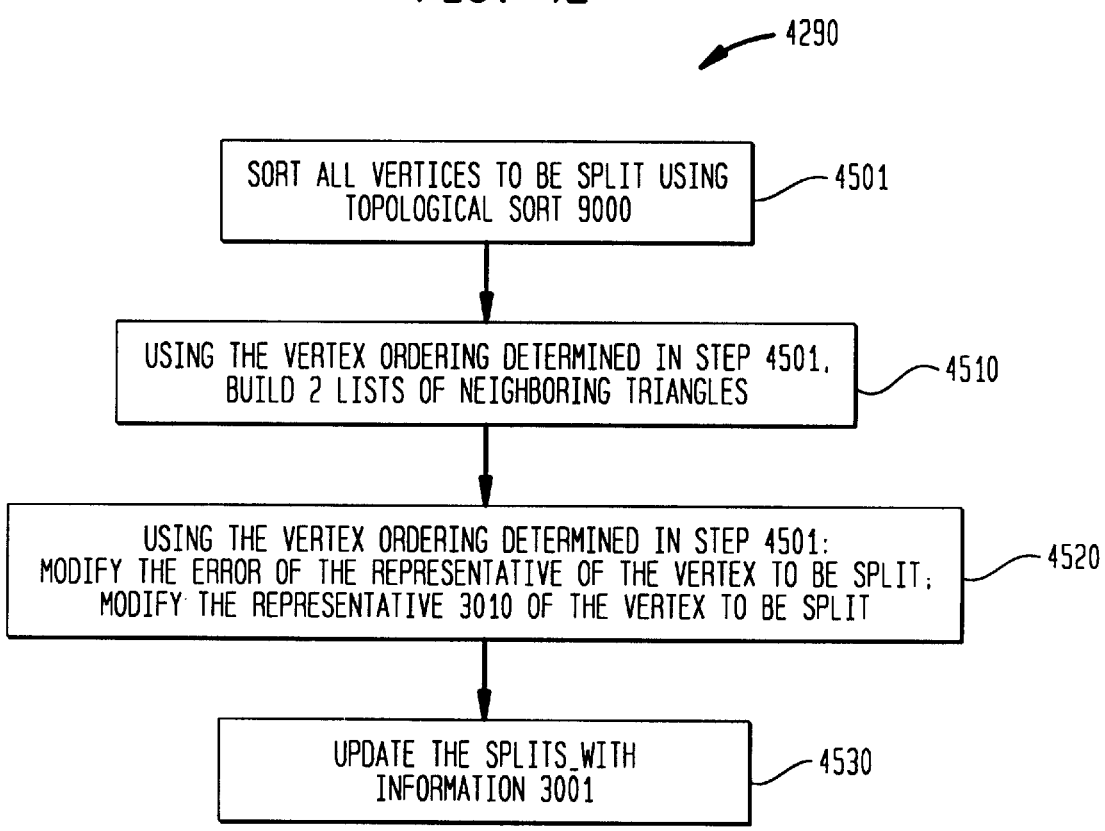
FIG. 4e is a flow chart showing detailed process steps of selecting a higher resolution of the model shape.

FIG. 4e is a flow chart illustrating the process 4290 of splitting vertices while respecting the "split before" partial ordering. One result of this is to provide a higher resolution for the segments/triangles of the 2D/3D shapes 2001. Step 4501 all vertices to be split are sorted using a topological sort process 9000 explained subsequently. In Step 4510, two lists of "added" and "affected" triangles are built using ordering of vertices determined in Step 4501 and the "triangles added" 3030 and "triangles affected "3040" structures. In Step 4520, in the order determined in Step 4501, for each vertex 4500 to be split, the "vertex error" 3060 of the "vertex representative" 3010 is modified as follows: the vertex 4500 is set to represent itself (be its own "vertex representative") 3010. The vertex error of the representative is reset as the error computed by the multiresolution process 4101 before a vertex collapse 11000 occurred. In Step 4530, the "splits with" structure 3001 is updated to reflect that each vertex 4500 has been split and cannot be split again (references to each vertex 4500 are removed from the "splits with" structure 3001).

Figure 5:
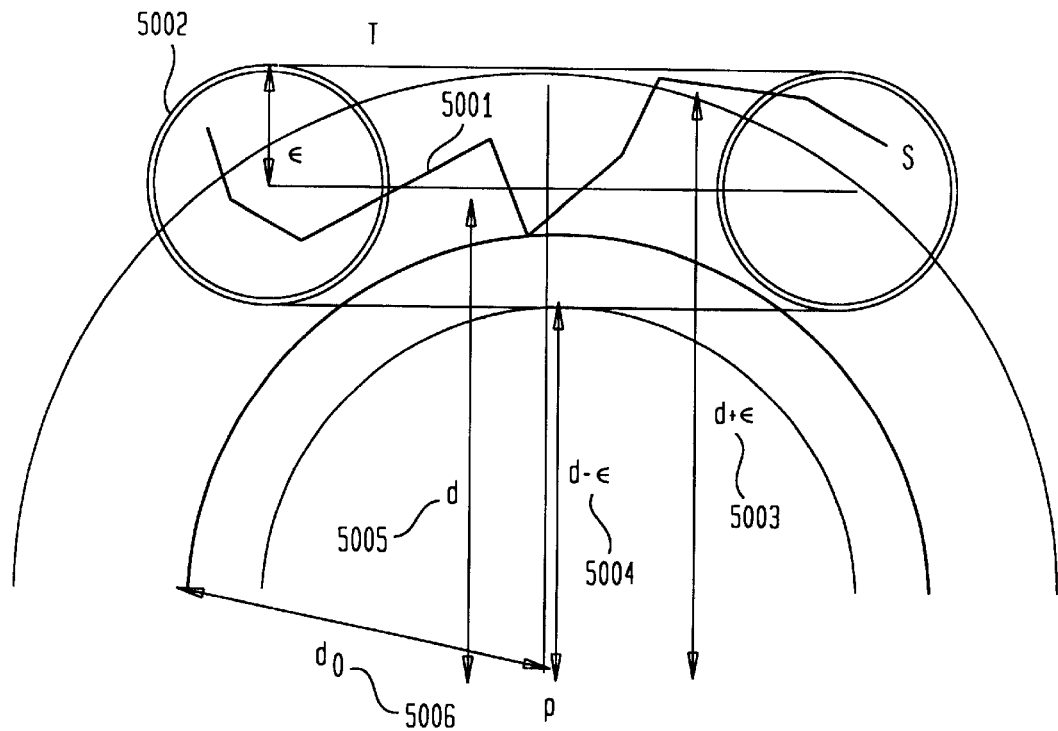
FIG. 5 is a diagram showing a portion of the shape (a line segment or polygon) within an envelope having an upper bound (representing an upper limit of a parameter or combination of parameters) and a lower bound (representing an lower limit of the parameter or the combination of parameters) and further shows the distance from the query point to the portion of the shape.
Figure 5A:
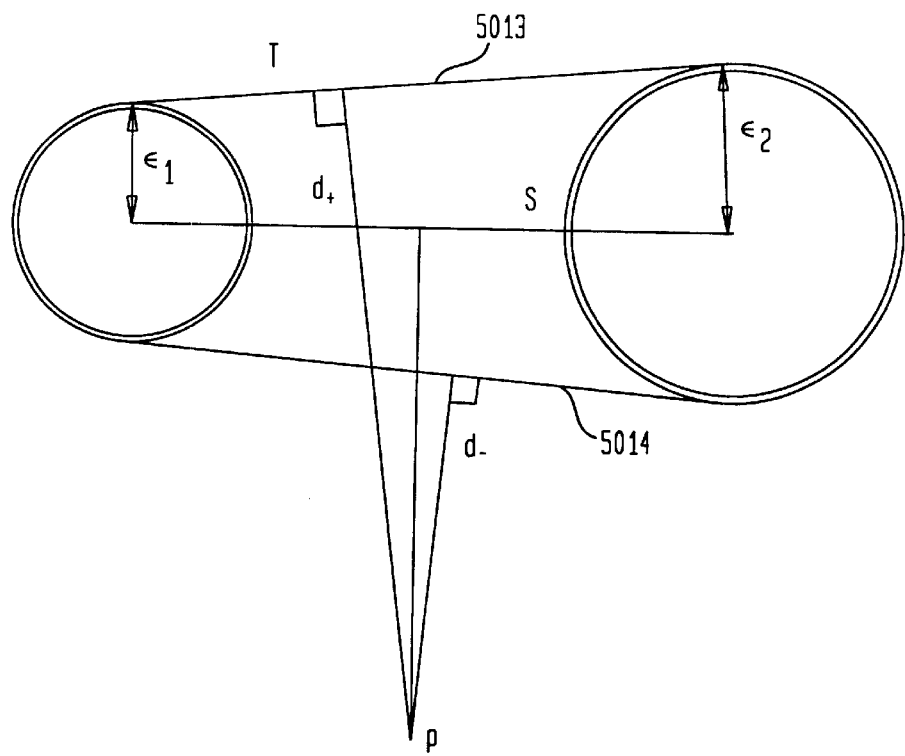
FIG. 5a is a diagram of an envelope with upper and lower bounds not parallel.

The processes 4330 and 4340 of associating a key to a triangle and inserting the triangle in the priority queue 3020 can be further understood by studying FIG. 5. Referring to FIG. 5, a portion of the shape is shown (a line segment or polygon) 5001 within an envelope 5002 of width ϵ having an upper bound (representing an upper limit of a parameter or combination of parameters) 5003 and a lower bound (representing an lower limit of the parameter or the combination of parameters) 5004, the upper bound and lower bounds being parallel to one another. FIG. 5 further shows the distance d (5005) from the query point to the portion of the shape. The distance from the query point to the portion 5001 of the shape is computed using methods known to those skilled in the art as set forth above. FIG. 5 further shows that a portion of the three dimensional shape 2001 is contained inside the volume defined by the upper 5003 and lower 5004 bounds. The distance $d_0$ (5006) from the query point to the portion of the three dimensional shape 2001 is such that $d - \epsilon \leq d_0 \leq d + \epsilon$.

FIG. 5a is a diagram of an envelope with upper 5013 and lower 5014 bounds not parallel, illustrating an alternate embodiment of the method. The distance $d_0$ from the query point to the portion of the three dimensional shape 2001 is such that $d- \leq d_0 \leq d+$, where d− is the closest point to the query point on the lower bound of the envelope and d+ is the closest point to the query point on the upper bound of the envelope. A triangle is then preferably entered in the priority queue 3020 using the d+ value for the key. A diagram of an envelope used for a three dimensional shape is shown in FIG. 6.

The ordering of the shape portions in the priority queue 3020 and the retrieval of the highest priority shape portion of Step 4250 can be further understood by examining FIG. 6. Referring to FIG. 6, the priority queue 3020 is represented with an oriented axis and the triangles are represented with intervals such as [d−ϵ, d+ϵ] positioned along the oriented axis 6100 in the order of priority (preferably increasing values of d−ϵ). Following the pictorial representation of FIG. 6, the highest priority triangle 6200 (or shape portion, which for a two-dimensional shape would be a segment) is represented with the leftmost interval, and triangles 6300 with lower priorities are represented to the right of triangle 6200.

Figure 7:
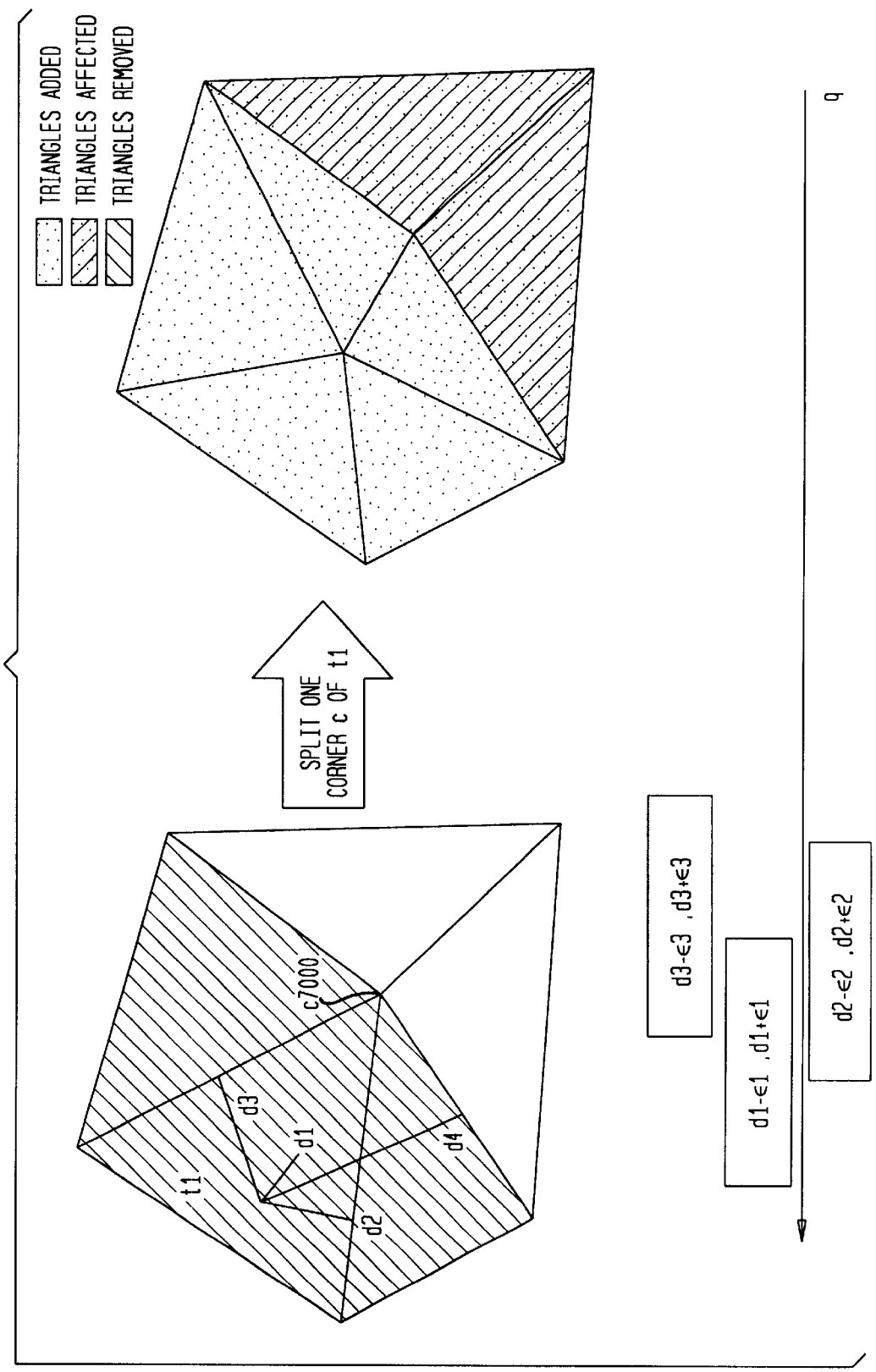
FIG. 7 is a diagram showing the splitting of vertices and the ordering of the polygons with split vertices in the priority queue.

The Step 4280 of determining the corner of a highest priority triangle 4200 to be split can be further understood by examining FIG. 7, showing a diagram of vertex splitting and ordering triangles with split vertices in the priority queue 3020. FIG. 7 further shows a corner c 7000 to be split. Triangles are added to the priority queue and removed from the priority queue as indicated by the shading in FIG. 7. "Triangles affected" 3040 are neither added nor removed from the priority queue 3020 but a flag is set to indicate that the distance and error value associated to them have been invalidated by the splitting of the corner c 7000. The process of splitting a vertex is explained in more detail in U.S. patent application Ser. No. 006,771, entitled COMPRESSED REPRESENTATION OF CHANGING MESHES AND METHOD TO DECOMPRESS, previously incorporated by reference.

One result of this priority ordering is hierarchical order of model resolutions.

Figure 8:
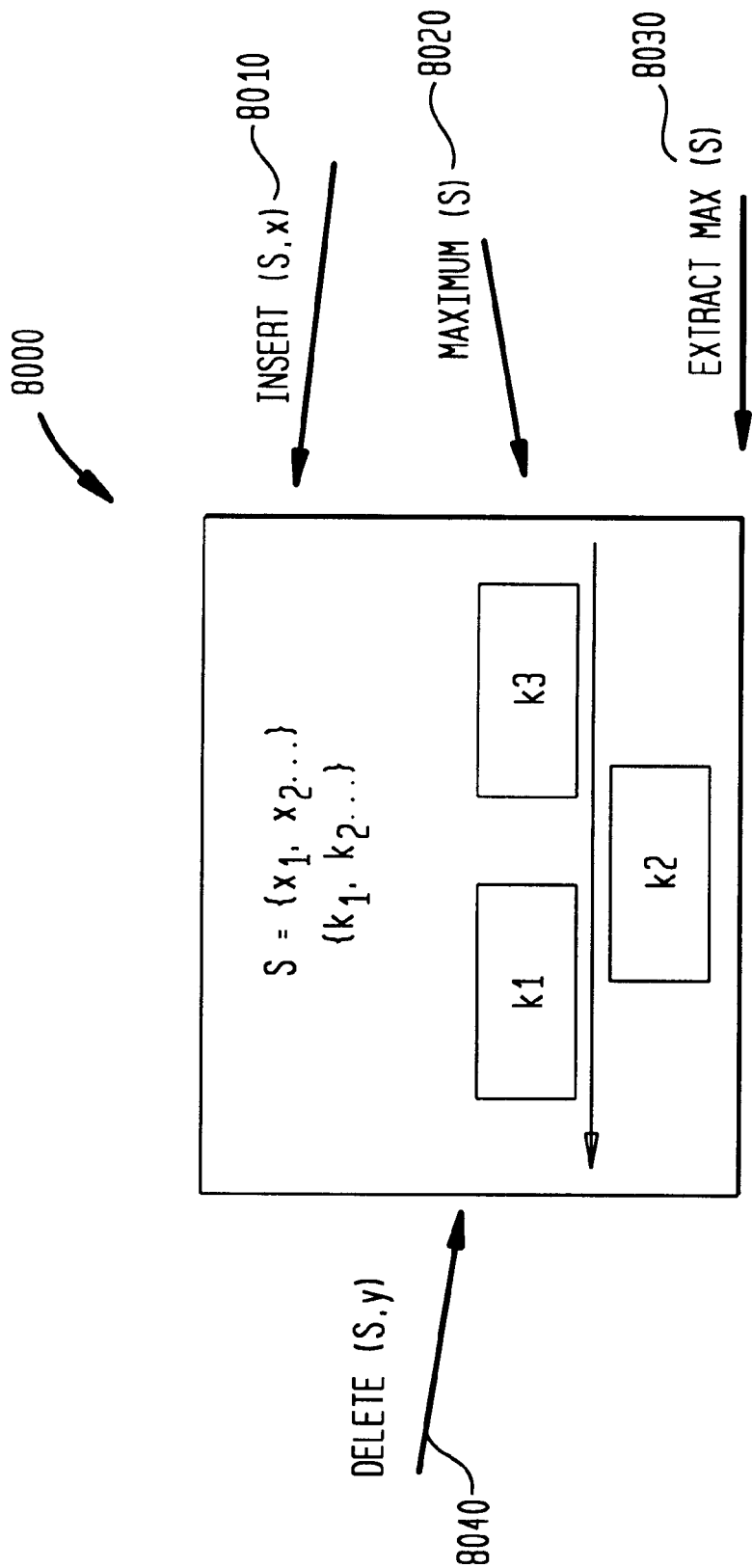
FIG. 8 is a block diagram of the priority queue.

Although a priority queue will be familiar to those skilled in the art (a priority queue is described in "Introduction to Algorithms" by Cormen, Leiserson, and Rivest, MIT Press, 1994 which is herein incorporated by reference), for completeness FIG. 8 shows a block diagram of the functionality implemented by a priority queue 8000. A priority queue 8000 maintains a set S of elements each with an associated value called a key. A priority queue 8000 supports the functionality of adding an element using the Insert(S,x) operation 8010, where S is the set of elements already in the queue, and x is the element which is added to the priority queue. A priority queue 8000 also implements the Maximum (S) operation 8020 returning the element in S with the highest priority. A priority queue 8000 also implements the Extract Max (S) operation 8030 that returns the element in S with the highest priority and removes it from the priority queue. A priority queue 8000 also implements the Delete (S,y) operation 8040 that removes the element y from the priority queue.

Figure 9:
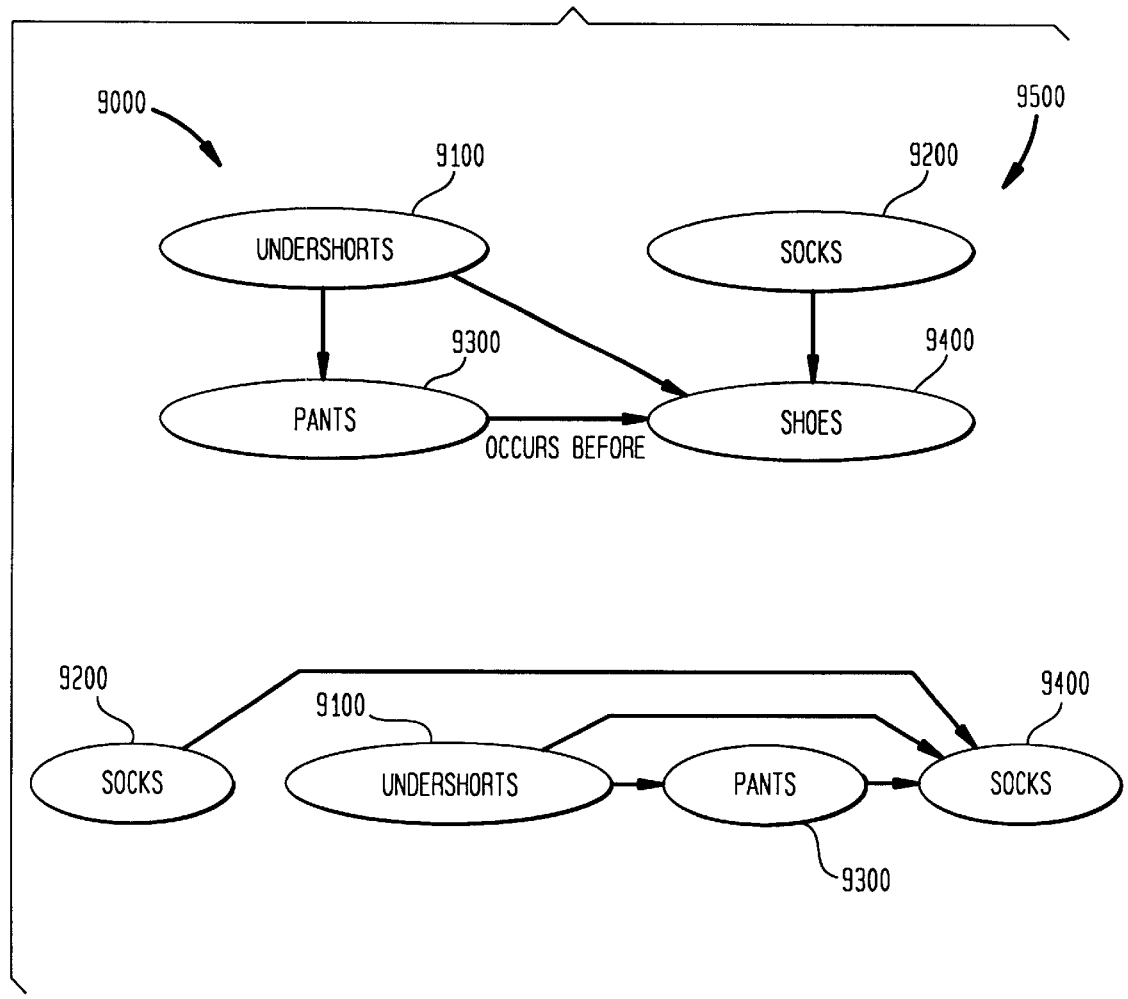
FIG. 9 shows an example of a prior art topological sort.

Although a topological sort operation will be familiar to those skilled in the art, for completeness FIG. 9 shows an example of a prior art topological sort 9000 that is used in Step 4501. A topological-sort process 9000 defines an order of traversal of a graph compatible with precedencies between vertices of a graph. For explanatory purposes, the vertices in FIG. 9 relate to a set 9500 of garment pieces 9500 that an individual would use to get dressed (under shorts 9100, socks 9200, pants 9300 and shoes 9400), and the arrows relate to the precedencies between the garment pieces (indicating according to which precedencies the individual may put the pieces of garment on) The bottom of FIG. 9 shows an ordering 9600 of the vertices compatible with the precedencies (indicating a sequence for putting the pieces of garment on: socks 9200 followed with under shorts 9100, followed with pants 9300 followed with shoes 9400). The advantage of the topologically sorted ordering 9600 with respect to the set 9500 is that the ordering 9600 can be used in practice to provide a valid sequence of garments that an individual can put on, whereas the set 9500 provides only a list of garments but does not specify in which order they should be put on.

Figure 10:
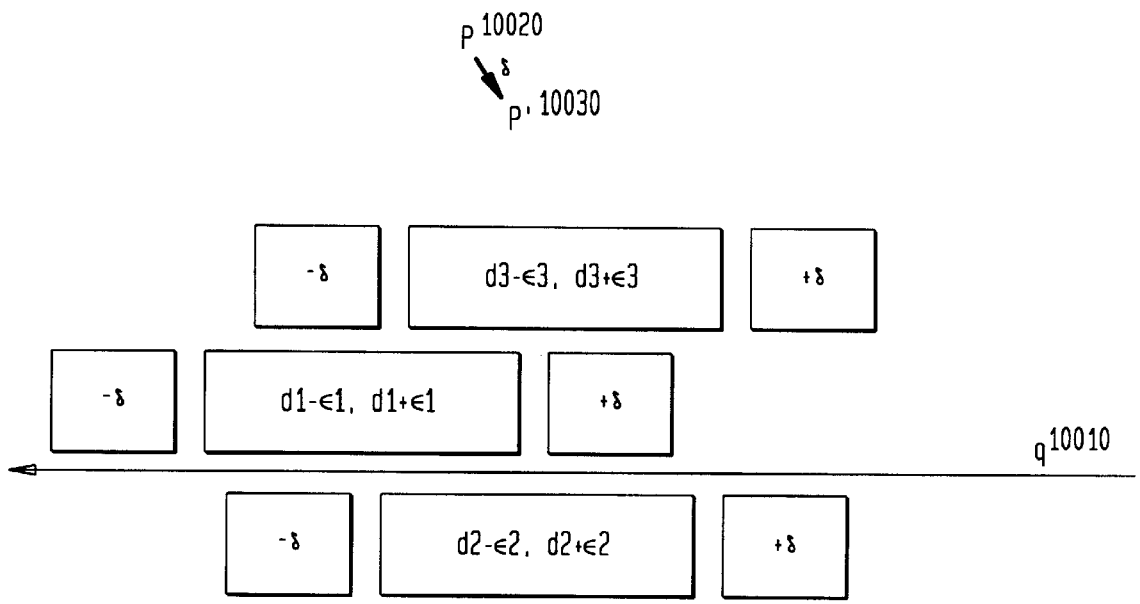
FIG. 10 is a block diagram of a reordered priority queue.

The process 4150 of perturbing the priority queue 3020 can be further understood by examining FIG. 10. Referring to FIG. 10, the priority queue 3020 is perturbed by subtracting a value δ to all the keys of the priority queue, leaving the priority order unchanged. The error associated with the shape portions (triangles or polygons) contained in the priority queue is increased by δ.

Figure 10A:
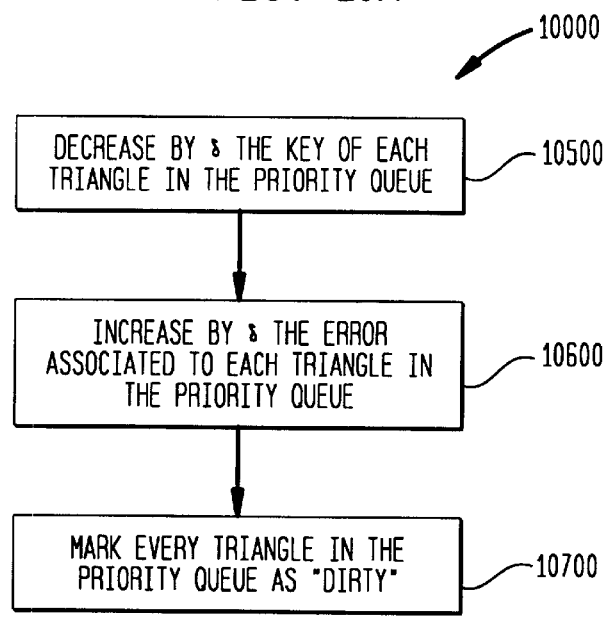
FIG. 10a is a flow chart of a process for changing the upper and lower bound when the query point moves without reordering the priority queue.

FIG. 10a is a flow chart of a process 10000 for changing the upper and lower bounds of the envelopes of the surface portions when the query point moves without reordering the priority queue. In Step 10500, the key of each surface portion in the priority queue is decreased by δ, where δ is the distance from the current position of the moving query point to the position that it assumed when a closest point was last queried using the priority queue 3020 and the process 4160 as set forth above. In Step 10600, the error associated to each surface portion in the priority queue is increased by δ. In Step 10700, every surface portion in the priority queue is marked as "dirty" indicating that while the bounds of the upper and lower envelopes associated with the surface portion apply, the distance to the surface portion has changed and should be recomputed. With reference to Step 4260 which is executed as part of Step 4160 of answering a closest point query, whenever a triangle is marked as "dirty", the process then executes Step 4263 of recomputing the distance and error associated to the triangle.

When the query point 2003 has moved, the process 1054 computes an inverse motion of magnitude represented with δ and applies the process 10000 of changing upper and lower bounds using the value δ.

Figure 11A:
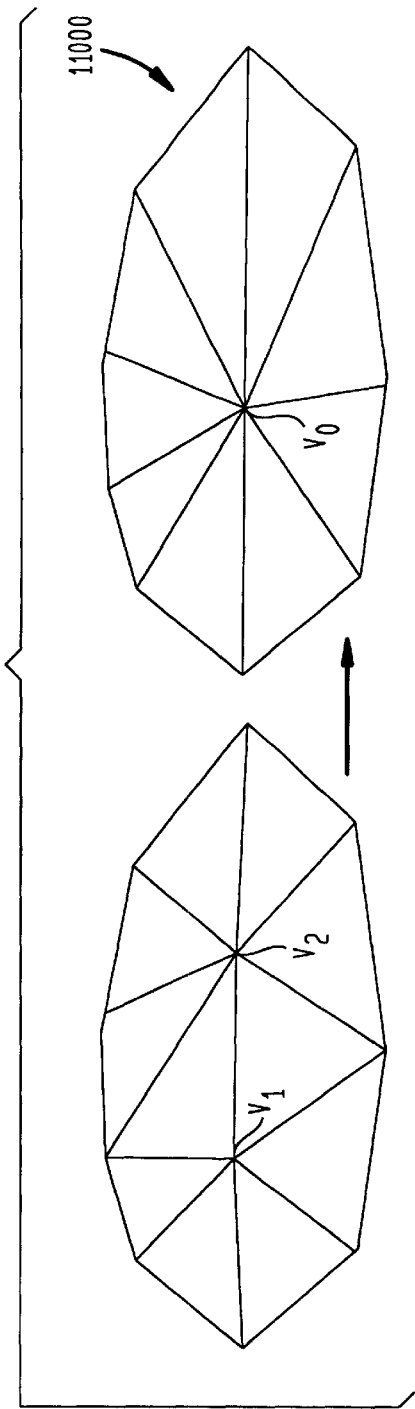
FIG. 11a is a diagram showing a collapsing edge.
Figure 11B:
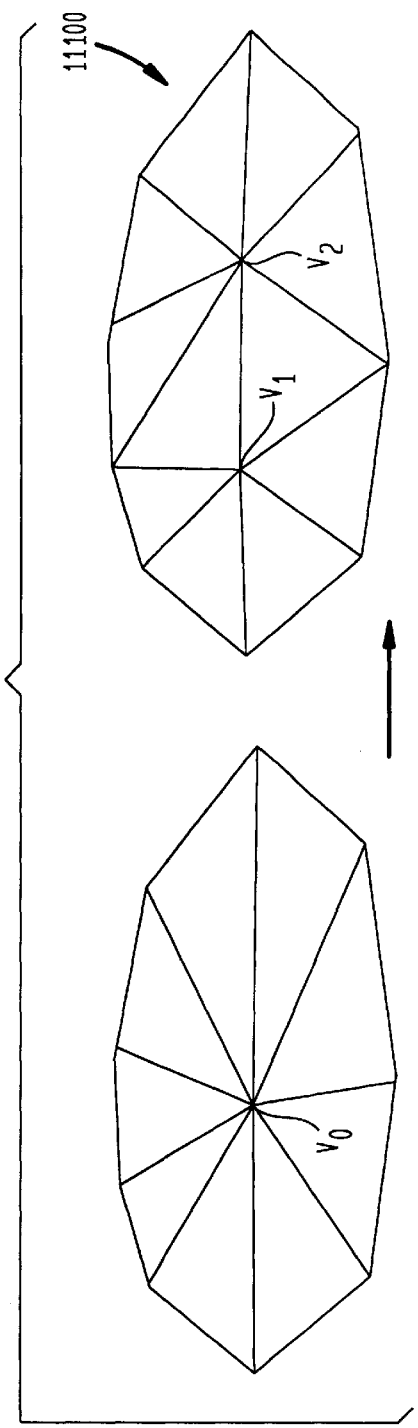
FIG. 11b is a diagram showing a vertex split.
Figure 12:
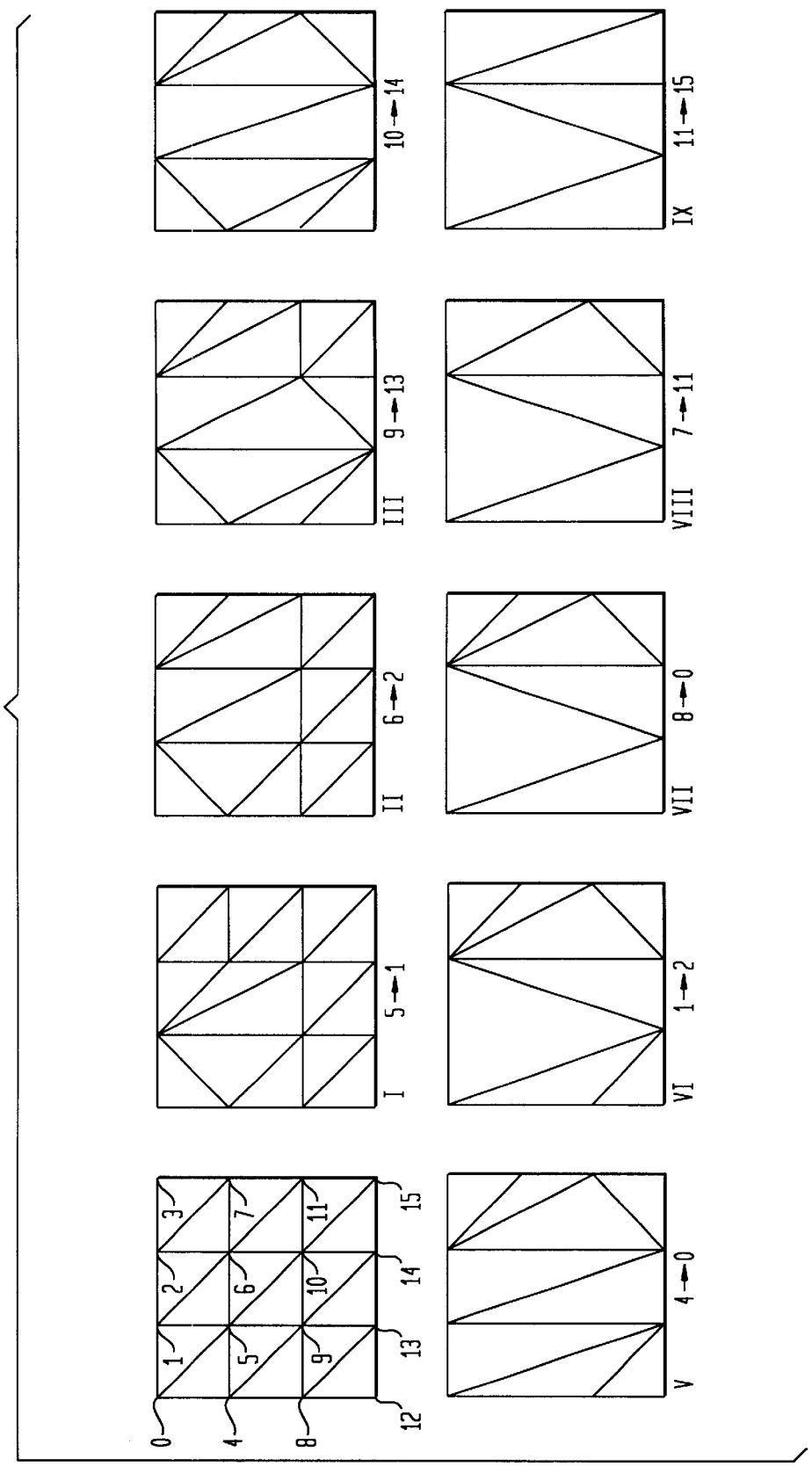
FIG. 12 is a diagram showing a sequence of edge collapses.
Figure 13:
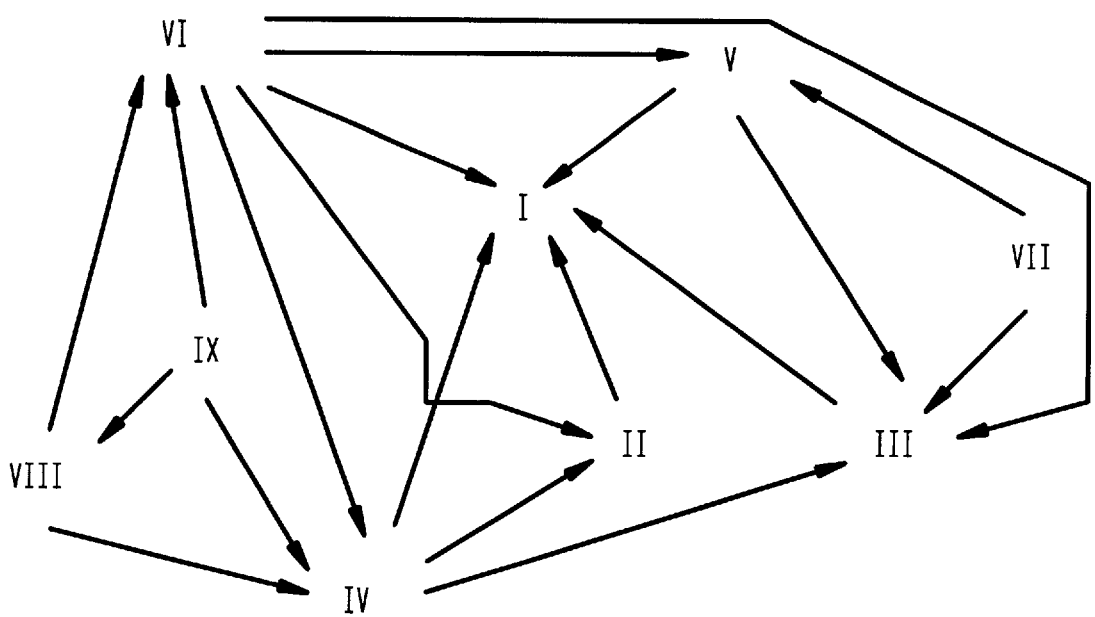
FIG. 13 is a diagram showing an acyclic graph used to represent the ordering of the hierarchy of resolutions.

Although the processes of collapsing and edge and splitting a vertex of a shape will be familiar to those skilled in the art, for completeness FIG. 11a is a diagram showing a edge collapse 11000. Collapsing an edge is performed by taking the two endpoints $v_1$ and $v_2$ of an edge and bringing them together to a new position $v_0$. During this operation two triangles are preferably removed from the shape. FIG. 11b is a diagram showing a vertex split 11100, which is the inverse operation of an edge collapse 11000. A multiresolution process such as process 4101 preferably applies a sequence of edge collapses 12000 to a shape 2001 to obtain a low resolution shape 2002 as illustrated in FIG. 12. An ordering on the edge collapses 11000 of a sequence of edge collapses 12000 is preferably determined as illustrated in FIG. 13. FIG. 13 further shows a directed acyclic graph used to represent the ordering of the edge collapses that defines a hierarchy of resolutions for the shape. A directed acyclic graph is known to those skilled in the art. A directed acyclic graph is further defined and described page 80 of "Introduction to Algorithms" by Cormen, Leiserson, and Rivest, MIT Press, 1994. Edge collapses are described in detail in U.S. patent application Ser. No. 023,757, entitled PROGRESSIVE MULTI-LEVEL TRANSMISSION AND DISPLAY OF TRIANGULAR MESHES, previously incorporated by reference. In U.S. patent application Ser. No. 023,757 it is also explained how edge collapses can be ordered as shown in FIG. 13, preferably by associating a positive integer level to endpoints of an edge that is collapsed, and by verifying whether vertices in the vicinity of an edge that is collapsed were assigned a positive integer level.

In an alternate embodiment of the present invention, a process 1054 computes an approximate Hausdorff distance between two shapes. The Hausdorff distance between two shapes is defined by computing the maximum of the distances from each point of the first shape to the second shape, computing the maximum of the distances from each point of the second shape to the first shape, and by taking the maximum of the two maxima.

The process 1054 preferably takes a first shape and chooses sample points on that first shape. Given the specification of a tolerance value, a preferred method for choosing sample points on a two dimensional shape consists of subdividing each segment of the two-dimensional shape in sub segments no longer than the tolerance value. A preferred method for choosing sample points on a three dimensional shape comprises spiraling around each triangle of the three dimensional shape, moving by increments equal to the tolerance value and removing from the triangle a ribbon of width equal to the tolerance value each time a tour of the triangle was completed.

The process then solves closest point queries 4000 for each of the sample points and the second shape. The approximate Hausdorff distance is the maximum distance reported by the closest point queries 4000 applied to the sample points.

Figure 14:
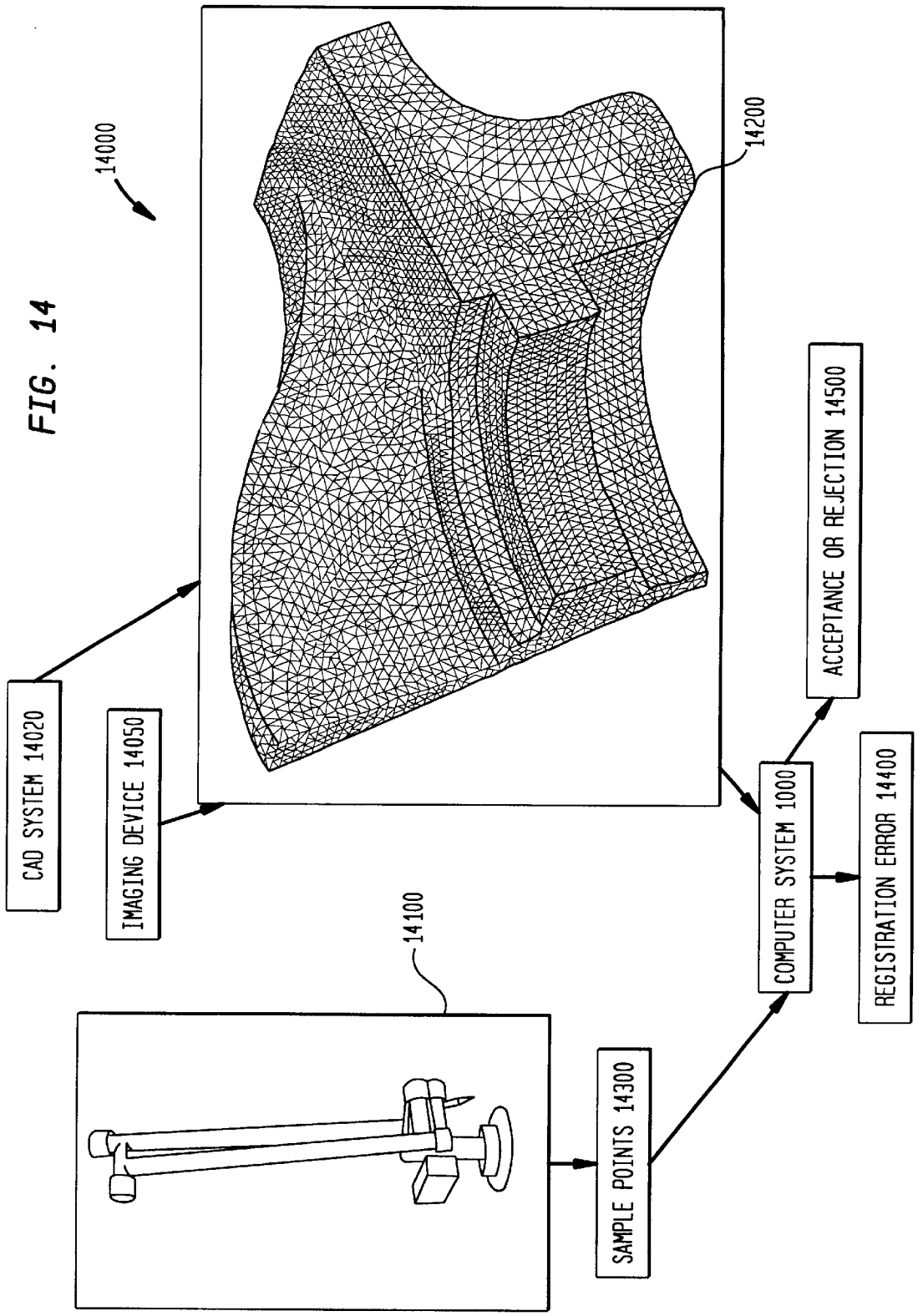
FIG. 14 is a block diagram or a system for registering a three-dimensional shape to a set of sample points of another three-dimensional shape.

In an alternate embodiment of the present invention, a system 14000 registers a three-dimensional shape to a set a measured points (registering is a process for computing a rotation and translation that, when applied to a first shape, aligns it with a second shape in an accurate fashion). The system 14000 is useful for testing whether a machined shape conforms accurately to its mathematical model, and for deciding whether the machined shape should be accepted or rejected. The system 14000 can be better understood when examining FIG. 14. The system 14000 comprises a robotic manipulator 14100, used to collect three or more sample points 14300 from a test three-dimensional shape 14200. A process 1055 is used to compute a registration of the sample points 14300 and three-dimensional shape 14200. The process 1055, in the computer system of FIG. 1, operates by applying the teachings of U.S. Pat. No. 5,715,166 previously incorporated by reference, that uses the method of Arun et al., described in "Least-Squares Fitting of Two 3-D Point Sets" that was published in the IEEE Transactions on Pattern Analysis and Machine intelligence, volume 9, number 5 in September 1987, which is herein incorporated by reference. The method of Arun et al. is used for computing a registration between the sample points 14300 and three-dimensional shape 14200. The registration is then applied to the three-dimensional shape 14200. The process 1055 operates as U.S. Pat. No. 5,715,166 teaches with the following important difference: Instead of using the method advocated by Besl and Mc Kay for finding the closest point to the sample points 14300 on the test shape 14200, the process 1055 uses instead the process 4000 previously described for finding the closest point on the test shape 14200. The process 1055 outputs a registration error 14400 or an acceptance or rejection 14500 of the shape as taught by Besl and Mc Kay.

In one preferred embodiment of the system 14000, the three-dimensional shape 14200 is obtained from a CAD (Computer Aided Design) system 14020. An example of CAD system 14020 is the Dassault Systemes CATIA system (CATIA is a trademark of Dassault Systemes). In an alternate embodiment, an imaging device 14050, such as a range scanner, or a CT-scan device, is used to generate the three-dimensional shape 14200. However,the imaging device could include any know device for acquiring images like any one or more of the following: a digital camera, a medical imaging, system, an x-ray system, an ultrasound system, a digital video camera.

Another alternative preferred embodiment of this invention is disclosed and claimed in U.S. patent application Ser. No. 09/235,428 entitled Method and System for Robust Shape Registration Using Multi-Resolution Closest-Point Queries to Gueziec, which is filed on the same day as this disclosure and which is herein incorporated by reference in its entirety.

I claim:

1. A system for determining a closest point on a shape to a query point comprising:

one or more memories for storing one or more geometric model portions, the geometric model portions having a plurality of line segments, each of the line segments being between a first and a second endpoint, wherein the line segments and end points are connected to form a shape including one or more parameters; and one or more central processing units (CPU's) for executing:
- a multiresolution process that creates one or more models of the shape, the one or more models having a hierarchy of resolutions, wherein each model comprises one or more model line segments approximating one or more of the line segments and wherein each model line segment is associated with an error;
- a distance process that for every model line segment determines a distance between a closest point on one or more of the model line segments and a query point, the distance representing one or more of the parameters, the distance process further determining an upper bound and a lower bound of an envelope enclosing the segment, the closest point being within the envelope, the upper bound representing an upper limit of the parameter in the envelope determined by an upper error of the respective model containing the model line segment and the lower bound representing a lower limit of the parameter in the envelope determined by a lower error of the respective model, wherein the upper bound and the lower bound of the envelope are parallel to each other or converging to each other; and
- a priority process that orders the model line segments according to their respective lower bounds if a maximum error for every one of the model line segments is less than a threshold, the priority process selecting a smallest distance as a minimum distance between the query point and the shape.

2. A system, as in claim 1, where, if one or more of the maximum errors is greater than the threshold the priority process, selects a model shape with a higher resolution.

3. A system, as in claim 2, where, if one or more of the maximum errors is greater than the threshold the priority process, selects a model with a higher resolution for the segments having the maximum error greater than the threshold.

4. A system, as in claim 2, where the model shape selected is the next in the hierarchical order.

5. A system, as in claim 2, where the model shape selected is not the next in the hierarchical order.

6. A system, as in claim 1, where the priority process orders the model line segments in a priority queue.

7. A system, as in claim 1, where the maximum error is the sum of the lower error and the upper error.

8. A system, as in claim 1, where the parameter distance represents any one and more of the following: a physical distance, a color, a texture, or a distance between data values.

9. A system, as in claim 1, where the query point is moving.

10. A system, as in claim 9, where the query point is on a second shape and the query point is moved until a minimum shape distance, within a shape tolerance, is determined between the shape and the second shape.

11. A system for determining a closest point on a surface to a query point comprising:
- on or more memories for restoring one or more geometric model portions, the geometric model portions having a plurality of polygons, each of the polygons having a polygon boundary, wherein the polygons and polygon boundaries are connected to form a surface including one or more parameters;
- one or more central processing units (CPU's) for executing:
  - a multiresolution process that creates one or more models of the surface, the models having a hierarchy of resolutions, wherein each model includes one or more model polygons approximately one or more of the polygons and wherein each model polygon is associated with an error;
  - a distance process that for every model polygon determines a distance between a closest point on one or more of the model polygons and a query point, the distance representing one or more of the parameters, the distance process further determining an upper bound and a lower bound of an envelope enclosing the polygons, the closest point being within the envelope, the upper bound representing an upper limit of the parameter in the envelope determined by an upper error of the respective model containing the model line segment and the lower bound representing a lower limit of the parameter in the envelope determined by a lower error of the respective model, wherein the upper bound and the lower bound of the envelope are parallel to each other or convergent to each other; and
  - a priority process that orders the model polygons according to their respective lower bounds if a maximum error for every one of the model polygons is less than a threshold, the priority process selecting a smallest distance as a minimum distance between the query point and the surface.

12. A system, as in claim 11, where the query point is on a second surface and the query point is moved until a minimum surface distance, within a surface tolerance, is determined between the surface and the second surface.

13. A system, as in claim 11, where there are more than one query point, and the query points in a query sequence and the system selects a sequence of smallest distances, each of the smallest distances associated with the respective query point in the query sequence.

14. A system, as in claim 11, where the query point is selected by a user using an input device.

15. A system, as in claim 11, where the geometric model portion is acquired from an imaging device.

16. A system, as in claim 15, where the imaging device includes any one or more of the following: a digital camera, a medical imaging system, a x-ray system, an ultrasound system, a CT scanner, a digital video camera.

17. A system, as in claim 11, where, if one or more of the maximum errors is greater than the threshold, selecting a model shape with a higher resolution.

18. A system, as in claim 17, where, if one or more of the maximum errors is greater than the threshold, selecting a model with a higher resolution for the segments with the maximum error greater than the threshold.

19. A system, as in claim 17, where the model shape selected is the next in the hierarchical order.

20. A system, as in claim 17, where the model shape selected is not the next in the hierarchical order.

21. A system, as in claim 11, where the priority process orders the model lines segments in a priority queue.

22. A system, as in claim 11, where the maximum error is the sum of the lower error and the upper error.

23. A system, as in claim 11, where the upper bound is parallel to the model line segment.

24. A system, as in claim 11, where the lower bound is parallel to the model line segment.

25. A system, as in claim 11, where the parameter distance represents any one or more of the following: a physical distance, a color, a texture, and a distance between data values.

26. A system, as in claim 11, where the query point is moving.

27. A system, as in claim 26, where the query point is on a second shape and the query point is moved until a minimum shape distance, within a shape tolerance, is determined between the shape and the second shape.

28. A system, as in claim 11, further comprising:
- a robotic manipulator with a controller for moving the robotic manipulator;
- one or more input devices for selecting one or more query points; and
- one or more imaging devices for creating the geometric model portion.

29. A method for finding a minimum distance between one or more query points and a shape in one or more geometric model portions, the geometric model portions having a plurality of line segments, each of the line segments being between a first and a second endpoint, wherein the line segments and end points are connected to form the shape, the shape including one or more parameters, the method further comprising the steps of:
- creating one or more models of the shape, the models having a hierarchy of resolutions, wherein each model has one or more model line segments approximating one or more of the line segments and wherein each of the model line segments is associated with an error;
- determining a distance between a closest point on one or more of the model line segments and a query point, the distance representing one or more of the parameters;
- determining an upper bound and a lower bound of an envelope enclosing the model line segment, the closest point being within the envelope, the upper bound representing an upper limit of the parameter in the envelope determined by an upper error of the respective model containing the model line segment and the lower bound representing a lower limit of the parameter in the envelope determined by a lower error of the respective model, wherein the upper bound and the lower bound of the envelope are parallel to each other or convergent to each other; and
- ordering the model line segments according to their respective lower bounds using a priority process if a minimum error for every one of the model line segments is less than a threshold, the priority process selecting a smallest distance as the minimum distance between the query point and the shape.

30. A program storage device readable by a machine, tangibly embodying a program of instructions executable by the machine to perform method steps for finding a minimum distance between one or more query points and a shape in one or more geometric model portions, the geometric model portions having a plurality of line segments, each of the line segments being between a first and a second endpoint, wherein the line segments and end points are connected to form the shape including one or more parameters, the method further comprising the steps of:
- creating one or more models of the shape, the models having a hierarchy of resolutions, wherein each model comprises one or more model line segments approximating one or more of the line segments and wherein each of the model line segments is associated with an error;
- determining a distance between a closest point on one or more of the model line segments and a query point, the distance representing one or more of the parameters;
- determining an upper bound and a lower bound of an envelope enclosing the model line segment, the closest point being within the envelope, the upper bound representing an upper limit of the parameter in the envelope determined by an upper error of the respective model containing the model line segment and the lower bound representing a lower limit of the parameter in the envelope determined by a lower error of the respective model, wherein the upper bound and the lower bound of the envelope are parallel to each other or convergent to each other; and
- ordering the model line segments according to their respective lower bounds if a maximum error for every one of the model line segments is less than a threshold, the priority process selecting a smallest distance as the minimum distance between the query point and the shape.

* * * * *